W. S. S. AUSTIN.
COASTER WAGON.
APPLICATION FILED FEB. 28, 1917.
1,236,038.
Patented Aug. 7, 1917.
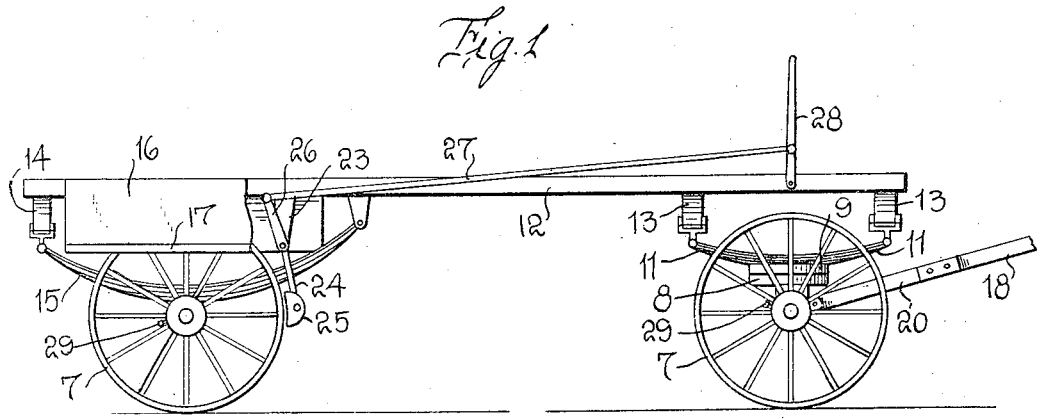
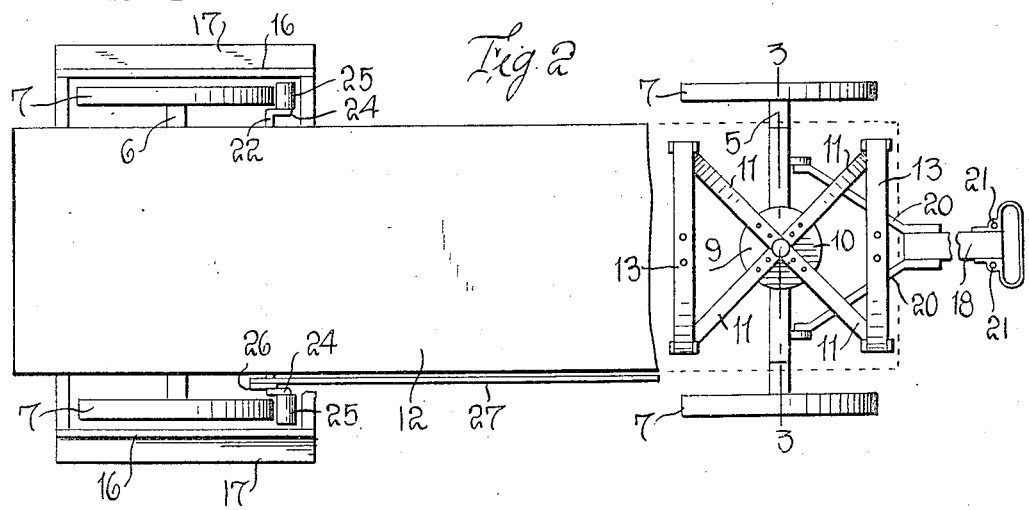
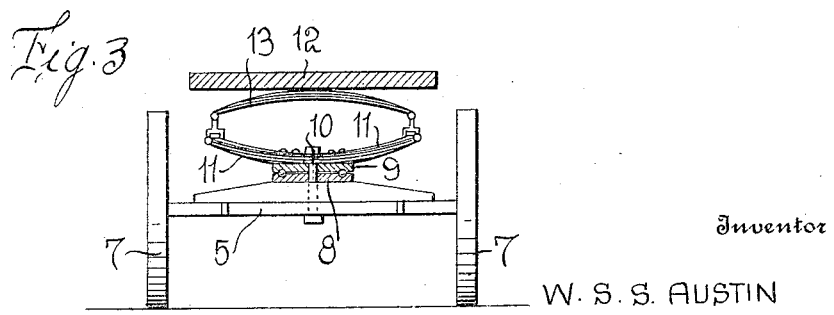
Inventor
W. S. S. AUSTIN
By Watson E. Coleman
Attorney

UNITED STATES PATENT OFFICE.

WILLIAM SNOW SMITH AUSTIN, OF JOHNSON CITY, NEW YORK.

COASTER-WAGON.

1,235,035.　　　　　Specification of Letters Patent.　　Patented Aug. 7, 1917.

Application filed February 28, 1917. Serial No. 151,545.

*To all whom it may concern:*

Be it known that I, WILLIAM S. SMITH AUSTIN, a citizen of the United States, residing at Johnson City, in the county of Broome and State of New York, have invented certain new and useful Improvements in Coaster-Wagons, of which the following is a specification, reference being had to the accompanying drawings.

This invention relates to an improved coaster wagon, and has for its primary object to provide an improved forward suspension means for the body of the wagon, whereby said body is yieldably supported, such supporting means being so arranged and constructed as to provide a serviceable and efficient shock absorber with the use of a relatively small number of parts.

It is a further general object of my invention to provide a device of the above character which is simple, as well as strong and durable in its construction, and capable of manufacture at relatively small cost.

With the above and other objects in view, my invention consists in the novel features of construction, combination, and arrangement of parts to be hereinafter more fully described, claimed and illustrated in the accompanying drawing, in which, Figure 1 is a side elevation of a coaster wagon constructed in accordance with one embodiment of the invention;

Fig. 2 is a top plan view, the forward end of the body board being broken away; and Fig. 3 is a section taken on the line 3—3 of Fig. 2.

Referring in detail to the drawing, 5 designates the front axle and 6 the rear axle of the wagon, said axles having the supporting wheels 7 revolubly mounted upon their opposite ends. The front axle 5 is suitably secured to a central, circular plate or disk 8 upon which the similar plate 9 is mounted to rotate and to which said latter plate is connected by means of the king bolt 10. Suitable ball bearings are interposed between these plates. A series of radially disposed leaf springs 11 are fixed at their inner ends to the plate 9, said springs 11 extending outwardly toward the opposite ends of the wheel axles. These leaf springs yieldably support the forward end of the body board 12, additional springs 13 being connected at their opposite ends to the extremities of the springs 11 and having their medial portions suitably fixed to the under side of said body board.

To the under side of the body board 12, at its rear end and adjacent its opposite edges, similar springs 14 are attached and their free ends connected to the longitudinally disposed, curved, leaf springs 15 which are fixed upon the ends of the axle 6. Thus, it will be seen that the body board 12 is yieldably supported and may move vertically with respect to the wheel axles.

To the rear end of the board 12 at opposite sides thereof, the angular guard plates 16 are secured, said guard plates having flanges 17 extending downwardly over the rear wheels, said flanges also serving as foot rests or supports.

18 designates a handle or pole, one end of which is connected by the rods 20 to the front wheel axle 5 at opposite sides of its center. This handle is provided adjacent its free end with eyes or rings indicated at 21, through which a cord or rope may be disposed, and by means of which the handle can be swung laterally to properly steer the wagon. It is manifest, of course, that various other steering devices might be substituted for the handle 18.

A transverse rock shaft 22 is mounted in suitable bearings 23 on the under side of the body board 12 in advance of the rear wheels, and the ends of this rock shaft are provided with angular arms 24 upon which the brake shoes 25 of any suitable construction, are secured. An arm 26 is also fixed to said rock shaft, adjacent one of its ends, and is connected by a rod 27 to a lever 28 suitably mounted upon one edge of the body board 12 adjacent its forward end. It will be readily understood that by simply manipulating this lever 28, the brake shoes 22 may be applied to the rear wheels of the wagon and the braking pressure regulated as desired. The wheels are preferably rubber tired.

Each of the wheel hubs is provided with an oil cup 29 and the bore of the hub may have a gasket of felt or other material therein to absorb the lubricant, whereby it will be continually applied to the periphery of the wheel axle.

From the foregoing description, taken in connection with the accompanying drawing, the construction and several advantages of the device will be clearly and fully understood. By mounting the body board upon the wheel axles in the manner above described, road shocks or jars are eliminated, thereby avoiding discomfort to the rider. The spring arrangement provides a maximum of resiliency and is, at the same time, strong and durable. It is apparent, of course, that the wagon may be made in various sizes and a greater or less number of the radially disposed springs 11 and the vertical springs 13 employed. It is, therefore, to be understood that while I have herein shown and described the preferred construction and arrangement of the several parts, it is to be understood that I reserve the privilege of adopting all such legitimate changes as may be fairly embodied within the spirit and scope of the invention as claimed.

Having thus fully described my invention, what I desire to claim and secure by Letters Patent is:

A front suspension means in a coaster wagon including a front axle, a plate upon which the axle is swiveled at its center, a plurality of radially disposed springs fixed at one of their ends upon the upper face of said plate, and additional transversely disposed springs arranged forwardly and rearwardly of the axle and in parallel relation thereto, the medial portions of said springs being fixed to the body board of the vehicle and the ends of said transverse springs being connected to the other ends of the radial springs which project upon the same side of the axle.

In testimony whereof I hereunto affix my signature in the presence of two witnesses.

WILLIAM SNOW SMITH AUSTIN.

Witnesses:
JAY L. ANDERSON,
MABEL B. TABER.